United States Patent

Larson

[15] 3,675,464
[45] July 11, 1972

[54] PORTABLE TESTING AND CHECKING APPARATUS WITH ADJUSTABLE MOUNTS

[72] Inventor: Kenneth R. Larson, Des Plaines, Ill.
[73] Assignee: Snap-On Tools Corporation, Kenosha, Wis.
[22] Filed: Jan. 18, 1971
[21] Appl. No.: 107,037

[52] U.S. Cl. ................................................73/1 C
[51] Int. Cl. ...........................................G01l 25/00
[58] Field of Search ..............................73/1 B, 1 C

[56] References Cited
UNITED STATES PATENTS
3,456,485   7/1969   Larson.....................................73/1 C

*Primary Examiner*—S. Clement Swisher
*Attorney*—Harry C. Alberts

[57] ABSTRACT

A torque wrench tester is mounted upon an adjustable bracket so that it may be changed from one angle to another with respect to horizontal. The purpose is to check torque wrenches at a plurality of positions because their calibration may vary from one to another. The embodyment shown combines two torque wrench testers of different capacities connected by common spacer bars so that wrenches of different capacities may be tested.

8 Claims, 5 Drawing Figures

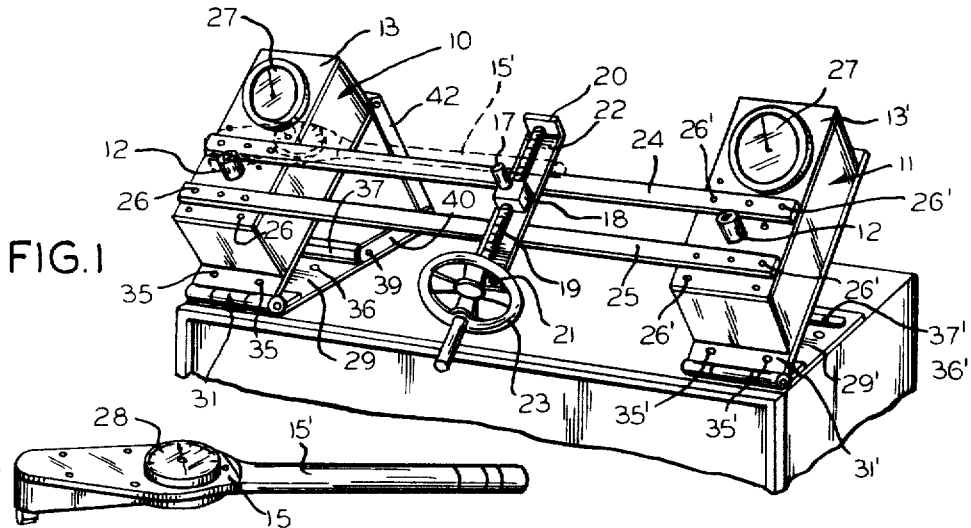

3,675,464

PORTABLE TESTING AND CHECKING APPARATUS WITH ADJUSTABLE MOUNTS

This invention relates to a portable testing and checking device for torque wrenches and the like, and more particularly to improved mounting mechanisms therefor, although certain features thereof may be employed with equal advantage for other purposes.

It contemplates more especially the provision of improved operating linkage and mounting mechanisms for portable torque wrench testers of the general type described in U.S. Pat. No. 3,456,485 dated May 5, 1966.

Portable testers for torque wrenches and the like are adaptable to most automobile engine service centers, production lines and test laboratories where work benches of the stationary or mobile type having flat tops are usually available and most useful. These situations often require accurate precision torque wrenches which should be tested frequently to insure accurate fastener tightening. Torque wrenches with minor variances can be adjusted on location while those showing appreciable variations are substituted and returned to the factory for adjustment. In order to enable tester units to function in a variety of planes with the measuring instruments to be tested and checked as well as adapt them to bench surfaces to simulate all actual use conditions, dual portable testers are mounted on adjustable brackets in spaced relation thereto. Further, clockwise and counterclockwise testing of torque wrenches is possible through the medium of a torque wrench handle actuator positioned therebetween to impart a turning load on the torque wrench operatively connected with either of the two spaced testers in sequence to test and check the accuracy of operation in a variety of both clockwise and counterclockwise directions. Then, too, the testers are mounted on adjustable brackets to enable testing therewith in a variety of angular positions relative to the table to meet the testing requirements in different planes of torque wrench turning movement as well as to view the calibrated dials in the most convenient position based upon the available illumination and position of the operator. Dual spaced testers of different capacities with an intermediate cross-carriage provide a greater range of testing for torque wrenches of different capacities so that the test apparatus is not limited to a single size of torque wrench.

One object of the present invention is to provide improved linkage and mounting mechanisms for portable testing and checking devices adaptable to precision torque wrenches of different sizes or capacities.

Another object is to provide spaced portable torque wrench testers of different capacities on adjustable brackets to enable testing and checking thereof in a variety of planes and in both clockwise-counterclockwise directions to simulate actual use conditions.

Still another object is to provide spaced portable testing and checking devices of different load registering capacities with linkage therebetween for testing different sizes of measuring instruments corresponding to the range of both testers, and doing so in a variety of angles and in both clockwise-counterclockwise directions simulate actual use requirements.

A further object is to provide a single cross-carriage actuator for spaced testers of different capacities so that measuring devices of different load ranges can be checked therewith to increase the usefulness of simple portable testers.

Other objects and advantages will appear from the following description of an illustrated embodiment of the present invention.

In the drawing:

FIG. 1 is a perspective view of a testing and checking apparatus embodying features of the present invention.

FIG. 2 is an end view in elevation of the apparatus shown in FIG. 1 and adjusted to a 45° angle for testing movement of measuring instruments in that plane of operation.

FIG. 3 is a plan view of the mounting bracket shown in FIGS. 1 and 2.

FIG. 4 is a perspective view of a torque measuring wrench to be tested for accuracy with the device shown in FIG. 1.

FIG. 5 is a fragmentary perspective view of the linkage to support the testers in a vertical plane as shown dotted in FIG. 2.

The structure selected for illustration is not intended to serve as a limitation upon the scope or teachings of the invention, but is merely illustrative thereof. There may be considerable variations and adaptations of all or part of the teachings depending upon the dictates of commercial practice. The present embodiment comprises a pair of spaced portable torque wrench testing and checking devices 10–11 of the general type described in U.S. Pat No. 3,456,485 issued May 5, 1966.

The testers 10–11 are identical in structure and operation, except that these are preferably of different load registering capacities to increase the range of torque wrench sizes to be tested therewith. As an example, the tester 10 may be of 200 inch pound capacity while the tester 11 should then be of 200 foot pound capacity or vice versa so that corresponding torque wrench sizes can be tested therewith, and a greater range of usefulness is accomplished therewith. To this end, each of the tester housings 10–11 are provided with a torque wrench adapter socket 12 projecting upwardly through the top wall 13 of the tester housings 10–11 so that the turning work engaging shank 14, in this instance of square cross-section, of a torque wrench 15 may engage the adapter socket 12 of either tester 10–11 in a position so that its handle 15' extends to and beyond the manual upstanding actuator carriage pin 17. It should be noted that corresponding parts of the tester 11 are primed with reference to the tester 10, since these are of identical construction except that the parts are provided with different moment arms to correspond with their respective dials 27–27'.

The upstanding actuator carriage pin 17 is part of an internally threaded cross-carriage block 18 which rides along an elongated carriage displacing Acme screw 19 journalled between spaced bearing flanges 20–21 extending upwardly from an elongated bearing bracket plate 22 along which the bottom of the cross-carriage block 18 rides to preclude turning thereof with the elongated intermediately positioned carriage screw 19.

A hand wheel 23 is axially anchored to the lower projecting end of the carriage displacing screw 19 to enable manual rotation thereof to impart corresponding rotation in either direction to the carriage displacing screw 19. This rotation provides linear transverse linear travel and displacement in either direction across and transversely of two elongated and parallel disposed spacer bars 24–25 which are attached by suitable fasteners 26 to the top plates 13 of both tester housings 10–11. As shown, the transversely extending carriage mounting bracket plate 22 is attached to both of the spacer bars 24–25 exactly at mid-point thereof so that the carriage pin 17 and block 18 will serve to impinge against the upper or lower transverse edge of the carriage pin 17 to turn the torque wrench 15 in a clockwise or counter-clockwise direction when engaging either socket 12 of the tester 10 or 11 depending upon the capacity size of the torque wrench 15 which must not be beyond the capacity turning load of the selected tester 10 or 11.

With the use of either tester 10 or 11, the handle 15' of the torque wrench 15, extends toward and beyond the carriage pin 17 either above or below the impinging edge thereof depending upon the direction of the turning load applied to enable a comparison between the registered torque load on the tester dial 27 and the torque wrench dial 28 which, if accurate, should correspond in their pointer positions on the calibrated dials 27–28. If the torque wrench dial 28 is below or above the reading on the tester dial 27, there are usually adjustment instrumentalities provided in the torque wrench 15 to correct the error therebetween. The testers 10–11 are periodically checked against dead weight loads which can be applied thereto with special weight hanging arms of the general type illustrated and described in U.S. Pat. No. 3,498,103 issued Mar. 3, 1970.

The testers 10 and 11 are each mounted on identical special brackets 29 (FIGS. 2 and 3) consisting of a substantially rectangular plate 30 having a full width hinge 31 provided with spaced apertures 32. With matching apertures on an extension 33 of the bottom tester housing plate 34 (FIG. 2), threaded fasteners 35 may be utilized therewith for rigid attachment of the bracket 29 to the upper side of the hinge 31. The tester housing support bracket plate 30 is also provided with a plurality spaced apertures 36, in this instance three, to enable the attachment thereof by means of suitable fasteners to the table top of a work bench (FIG. 1). In order to adjustably mount and support the hinged tester housings 10–11 relative to work bench top or the like, a strap 37 is welded or otherwise attached to the bracket plate 30 along the extreme edge 35 thereof which is opposite to the hinge 31 and parallel thereto. A rigid upstanding ear 38 extends from the strap 37 to receive a rivet 39 therethrough for pivotal connection to a comparatively short flat lever arm 40 that is capable of a full 180° swing relative to the bracket plate 30 for rotary displacement therealong on both sides of the pivot pin 39 to provide for adjustable angular positioning of the testers 10–11 as will appear more fully hereinafter.

The straight lever arm 40 is disposed parallel to and in pivotal connection as at 41 with a substantially longer lever arm 42 to extend beyond the end 43 of the bracket plate 30 in collapsed position relative thereto (FIG. 3). A right angularly disposed bracket strap 44 having an offset upstanding ear 45 for pivotal connection as at 45' to the extremity of the lever arm 42. A rubber friction foot 46 is attached to the flat exterior side of the strap 44 intermediate the ends thereof to rest on the horizontal table top 47 of the stationary or mobile work bench 48 when the tester bracket plate 30 and the testers 10–11 are substantially aligned flat on the table surface 47 of the stationary or mobile bench 48 (FIG. 1) with the lever arms 40–42 collapsed in aligned frictional contact (FIG. 3). The bracket plate 44 is provided with spaced apertures 49 (FIG. 3), in this instance 2, which enable the attachment thereof with suitable fasteners to the upper edge 50 of the housing bottom plate 34 beyond the housings 10–11 (FIG. 2) so that both testers 10–11 will be supported in the same angular position with the aid of the transverse parallel spacing bars 24–25 extending rigidly therebetween.

In order to support the tester housings 10–11 in an angular position of substantially 35° as illustrated in FIG. 1, the other end of the lever arm 42 is provided with an angular and slightly twisted ear 51 which also has a rubber foot 52 (FIG. 3) attached thereto to make contact with the bench top surface 47 and frictionally maintain the angular position of the lever arm 42 with the testers 10–11 attached to their respective bracket straps 44. The testers 10–11 can also be vertically disposed by pivotally displacing the lever arms 40 in a counterclockwise direction (viewed from FIG. 2) to a position proximate and parallel to the tester bracket hinged plate 30. The lever arm 42 is then displaced vertically upright with the rubber foot 52 thereof on the bench top 47 to maintain the testers 10–11 upright in that the bracket strap 44 rotates relative to the lever arm 42 to accommodate the various positions thereof described herein.

The three adjustable tester positions, namely lying flat horizontally, angularly at about 35° from the table surface 47, and vertically upright (dotted outline in FIG. 2) insure testing in all of these planes and positioning according to the best available illumination as well as afford direct reading of the pointers on the calibrated tester dials 27–27' and the torque wrench dial 28 for comparison. It is well known that calibrated dial pointers show substantial reading variations relative to its proper alignment with the calibration in confronting relation thereto depending upon the angle of viewing by the eye of the observer. For this reason, the testers 10–11 must be properly positioned relative to the observer to insure correct observation alignment between the pointer and the calibration in direct confrontation therewith depending upon the convenience of the observer.

It should be observed that measuring instruments such as torque wrenches which are used to turn fasteners in a variety of different planes, should be tested and checked in corresponding angular planes of movement to simulate actual use conditions and circumstances. Variations occur owing to the fact that the gravitational effect is different on individual parts confined in a housing or casing due to torque wrench turning in different planes and thus accuracy varies over an extended period of use. It is for this reason that the testers 10–11 are adjustably mounted to provide different angles of support for testing and checking in all the different positions simulating conditions of actual use in order to determine their total accuracy. In making dial reading comparisons as between the tester dials 27 or 27' and the torque wrench dial 28, the operator should exercise care in viewing the calibrations and pointers thereof in direct frontal and close range to preclude variations that would otherwise be observed much like the well known observation that an automobile speedometer reads differently to the front seat passenger than to the driver who sits directly in line with the speedometer pointer or the registry line on linear calibrated surfaces.

While I have illustrated and described a preferred embodiment of the invention, it must be understood that the invention is capable of considerable variation and modification without departing from the spirit of the invention. I, therefore, do not wish to be limited to the precise details of construction set forth, but desire to avail myself of such variations and modifications as come within the scope of the appended claims.

I claim:

1. A portable torque wrench tester comprising a tester housing having a work engaging socket and a torque calibrated dial thereon, a bracket hinged to said tester housing, means for adjustably supporting said tester housing in a variety of angular positions on a horizontal support surface therefor, and a mechanically displaceable cross-carriage to support a measuring dial equipped torque wrench between said housing socket and said cross-carriage to impart a turning movement to said torque wrench to impress a torque load on said tester for an extent indicated by its own measuring dial for comparative check purposes.

2. A portable torque wrench tester defined in claim 1 wherein screw displacing means are provided on said cross-carriage to simultaneously impress a turning load on said tester and torque wrench in both a clockwise and counter-clockwise direction for dial comparisons therebetween.

3. A portable torque wrench tester defined in claim 2 wherein a pair of testers of different capacities are spaced oppositely from said cross-carriage and correspondingly mounted so that either of said testers can be utilized with torque wrenches of commensurate capacities.

4. A portable torque wrench tester defined in claim 3 wherein the spaced testers and the cross-carriage are maintained in rigid spaced relation with transverse elongated bar means anchored between and to said tester housings and said cross-carriage.

5. A portable torque wrench tester defined in claim 1 wherein the adjustably supporting means for each tester housing comprise a hinge bracket attached thereto and to a horizontal supporting surface, and interpivoted lever arms pivoted between said hinge brackets and said tester housings to provide bracket adjustable support therefor relative to said horizontal support surface in a variety of positions for varying observations during testing of torque wrenches therewith.

6. Portable torque wrench testers for wrenches of different capacities defined in claim 5 wherein said supporting lever arms have friction feet to engage the supporting surface for maintaining said tester housings in a variety of angular positions depending upon the pivotal relative positions of the lever arms relative to each other and to said supporting surface.

7. Portable torque wrench testers for wrenches defined in claim 3 wherein said adjustable supporting means comprise a hinged bracket and interpivoted lever arms pivoted to said hinge bracket to support the tester housings in a variety of angular positions relative to a horizontal supporting surface.

8. Portable torque wrench testers for wrenches defined in claim 4 wherein said adjustable supporting means comprise a hinged bracket and interpivoted lever arms pivoted to said hinge bracket to support the tester housings in a variety of angular positions relative to a horizontal supporting surface.

* * * * *